(12) United States Patent
Nakajima et al.

(10) Patent No.: US 9,476,706 B2
(45) Date of Patent: Oct. 25, 2016

(54) DETECTION APPARATUS AND VEHICLE (71) Applicants: Mitsuru Nakajima, Kanagawa (JP); Shuichi Suzuki, Kanagawa (JP)

(72) Inventors: Mitsuru Nakajima, Kanagawa (JP); Shuichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/329,231

(22) Filed: Jul. 11, 2014

(65) Prior Publication Data
US 2015/0029487 A1    Jan. 29, 2015

(30) Foreign Application Priority Data

Jul. 29, 2013  (JP) ................................ 2013-156342

(51) Int. Cl.
| | | |
|---|---|---|
| G01C 3/08 | (2006.01) | |
| B60W 30/16 | (2012.01) | |
| G08G 1/16 | (2006.01) | |
| G01S 17/93 | (2006.01) | |
| G01S 7/481 | (2006.01) | |
| G01S 13/93 | (2006.01) | |

(52) U.S. Cl.
CPC ................ *G01C 3/08* (2013.01); *B60W 30/16* (2013.01); *G01S 7/4813* (2013.01); *G01S 17/936* (2013.01); *G08G 1/16* (2013.01); *G01S 2013/9389* (2013.01)

(58) Field of Classification Search
None
See application file for complete search history.

(56) References Cited

U.S. PATENT DOCUMENTS

| | | | | |
|---|---|---|---|---|
| 4,447,800 A | * | 5/1984 | Kasuya | B60Q 1/52 340/901 |
| 5,171,363 A | * | 12/1992 | Phillips | B05D 1/286 106/31.65 |
| 5,629,690 A | * | 5/1997 | Knoll | B60R 19/483 340/435 |
| 7,138,619 B1 | * | 11/2006 | Ferrante et al. | 250/216 |
| 2005/0115943 A1 | * | 6/2005 | Winter | B60S 1/0848 219/202 |
| 2006/0086710 A1 | * | 4/2006 | Meiler | H01Q 1/02 219/202 |
| 2006/0284515 A1 | * | 12/2006 | Nakajima | 310/311 |
| 2008/0117080 A1 | * | 5/2008 | Kudelko | B60Q 1/22 340/932.2 |
| 2013/0077083 A1 | | 3/2013 | Suzuki et al. | |
| 2013/0120734 A1 | | 5/2013 | Ogata et al. | |
| 2013/0201014 A1 | * | 8/2013 | Luchinskiy | B60Q 1/0035 340/475 |
| 2013/0229645 A1 | | 9/2013 | Suzuki et al. | |
| 2014/0002878 A1 | | 1/2014 | Hayashi et al. | |
| 2014/0003062 A1 | | 1/2014 | Yoshimura et al. | |
| 2014/0009747 A1 | | 1/2014 | Suzuki et al. | |
| 2014/0034817 A1 | | 2/2014 | Nakamura et al. | |
| 2014/0071428 A1 | | 3/2014 | Suzuki et al. | |

FOREIGN PATENT DOCUMENTS

| | | |
|---|---|---|
| JP | 6-051054 | 2/1994 |
| JP | 8-184675 | 7/1996 |

(Continued)

*Primary Examiner* — Luke Ratcliffe
*Assistant Examiner* — Samantha K Abraham
(74) *Attorney, Agent, or Firm* — Oblon, McClelland, Maier & Neustadt, L.L.P.

(57) ABSTRACT

A detection apparatus attachable to a structure includes a transmission unit to transmit a transmission signal; a receiving unit to receive a reflection signal of the transmission signal reflected from a detection target; and a detection processing unit to detect the detection target based on the reflection signal. The structure includes a transmission translucent portion and a receiving translucent portion. The transmission signal having a given wavelength range passes through the transmission translucent portion, and the reflection signal having a given wavelength range passes through the receiving translucent portion.

13 Claims, 9 Drawing Sheets

(56) References Cited

FOREIGN PATENT DOCUMENTS

| JP | 2006-194639 | 7/2006 |
| JP | 2009-103482 | 5/2009 |
| JP | 2011-053577 | 3/2011 |

* cited by examiner

DETECTION APPARATUS AND VEHICLE

This application claims priority pursuant to 35 U.S.C. §119(a) to Japanese Patent Application No. 2013-156342, filed on Jul. 29, 2013 in the Japan Patent Office, the disclosures of which are incorporated by reference herein in their entirety.

BACKGROUND

1. Technical Field

The present invention relates to a detection apparatus to detect a detection target, and a vehicle including the detection apparatus.

2. Background Art

Recently, technologies using a detection apparatus to detect outside a vehicle going in one direction and to assist the driving of the vehicle for enhanced safety driving have been developed (hereinafter, referred to active safety technology).

The active safety technology includes, for example, a technology to stop a vehicle automatically to avoid a collision with a detected object, a technology to remain a vehicle in a detected driving lane by automatically adjusting steering effort of the vehicle, and a technology to drive the vehicle by following a detected ahead vehicle.

Further, the active safety technologies includes, for example, a technology to display a detected object on a head-up display by high-lighting on a windshield to alert a driver of the vehicle.

As to the active safety technology, a detection apparatus included in a vehicle is used to detect a detection target such as an object, white line of driving lane, an ahead vehicle, and to measure distance to the detection target.

A control unit included in the vehicle instructs various devices of the vehicle to devise the above mentioned active safety based on information of detection of the detection target and distance information to the detection target obtained by the detection apparatus.

Figure 1:
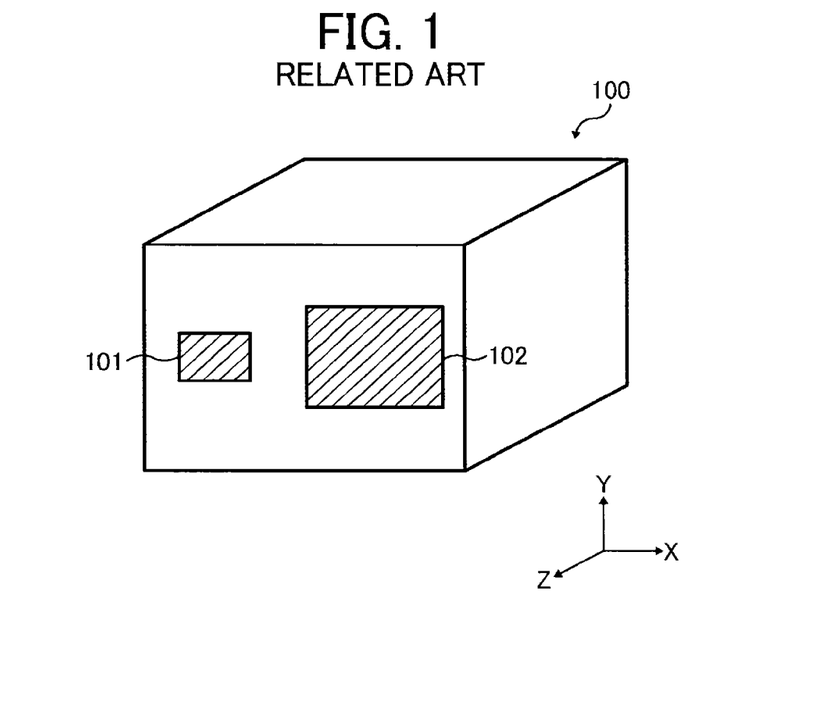
FIG. 1 is a perspective view of a conventional detection apparatus.

FIG. 1 is a schematic perspective view of a conventional detection apparatus 100. As shown in FIG. 1, the detection apparatus 100 includes a transmission unit 101 and a receiving unit 102. The transmission unit 101 transmits a signal to a detection target, and the receiving unit 102 receives a reflection signal reflected from the detection target.

The detection apparatus 100 is attached to a vehicle by facing the detection apparatus 100 to a forward direction of the vehicle, which may be a direction that the detection target exists (hereinafter, "distance measuring direction").

Figure 2:
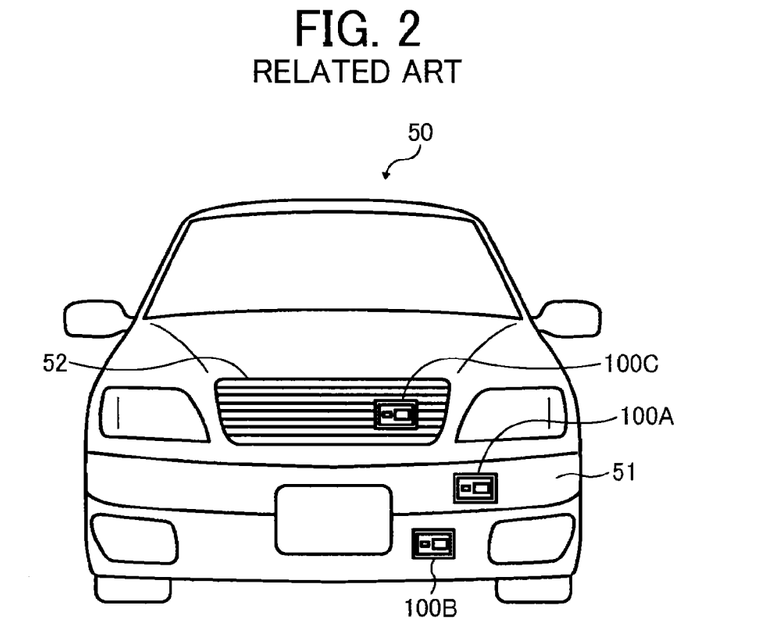
FIG. 2 is a front view of a vehicle indicating conventional attachment positions of detection apparatuses.

For example, FIG. 2 is a front view of a vehicle and conventional attachment positions of the detection apparatus 100. As shown in FIG. 2, the detection apparatus 100 can be attached to components of a vehicle 50 such as inside a bumper 51 of the vehicle 50, under the bumper 51 of the vehicle 50, or inside a front grille 52 of the vehicle 50.

In FIG. 2, a detection apparatus 100A is attached inside the bumper 51, a detection apparatus 100B is attached under the bumper 51, and a detection apparatus 100C is attached inside the front grille 52.

The detection apparatus 100 is required to be attached to a component of the vehicle 50 with a condition that no blocking objects exist in a detection direction to secure sensitivity of signal transmission and receiving.

Conventionally, an opening is provided to a component of the vehicle 50 such as in the bumper 51 and the front grille 52 to attach the detection apparatus 100, with which strength of component may become lower.

Further, because the detection apparatus 100 is attached by disposing the opening of the vehicle 50, weatherproof (e.g., water-proof, dust-proof) of the detection apparatus 100 may become lower.

SUMMARY

In one aspect of the present invention, a detection apparatus attachable to a structure is devised. The detection apparatus includes a transmission unit to transmit a transmission signal; a receiving unit to receive a reflection signal of the transmission signal reflected from a detection target; and a detection processing unit to detect the detection target based on the reflection signal. The structure includes a transmission translucent portion and a receiving translucent portion, the transmission signal having a given wavelength range passes through the transmission translucent portion, and the reflection signal having a given wavelength range passes through the receiving translucent portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, an apparatus or system according to an example embodiment is described hereinafter.

A description is given of a detection apparatus and a vehicle according to an example embodiment of the present invention with reference to the drawings. In this description, a vehicle is not limited to a specific one but includes any kinds such as automobiles, ships, airplanes, robots, or the like (Detection Apparatus (1))

A description is given of a detection apparatus 10 according to an example embodiment.

The detection apparatus 10 includes, for example, a transmission unit to transmit a transmission signal, a receiving unit to receive a reflection signal reflected from a detection target, and a detection processing unit to detect the detection target based on the reflection signal. The detection apparatus 10 is attached to a structure such as a component of a vehicle.

To be described later, the structure includes a translucent portion used as a transmission translucent portion and a receiving translucent portion. Wavelength range of the transmission signal can pass through the transmission translucent portion, and further, wavelength range of the reflection signal can pass through the receiving translucent portion.

(Configuration of Detection Apparatus)

Figure 3:
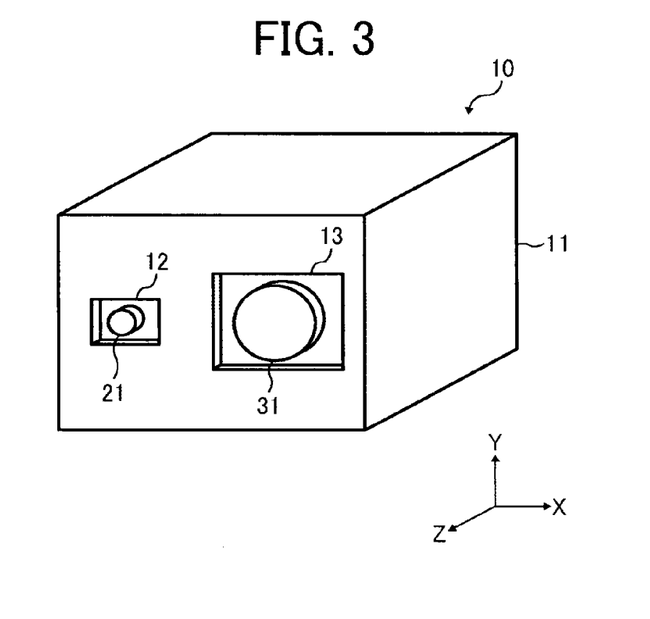
FIG. 3 is a perspective view of a detection apparatus according to an example embodiment.

A description is given of a configuration of the detection apparatus 10. FIG. 3 is a perspective view of the detection apparatus 10. As shown in FIG. 3, as to the detection apparatus 10, a projection face of a light projection lens 21 is exposed from a transmission translucent window 12 disposed at one face of a casing 11. Further, as to the detection apparatus 10, a receiving face of a light receiving lens 31 is exposed from a receiving translucent window 13 disposed at one face of the casing 11. Further, the detection apparatus 10 is attached to a structure, for example, a component of a vehicle. The detection apparatus 10 detects a detection target outside the vehicle and measures distance to the detection target from the detection apparatus 10.

When the detection apparatus 10 is attached, the transmission translucent window 12 and the receiving translucent window 13 disposed on the one face of the casing 11 face a direction for detecting a detection target (hereinafter, detection direction).

Figure 4:
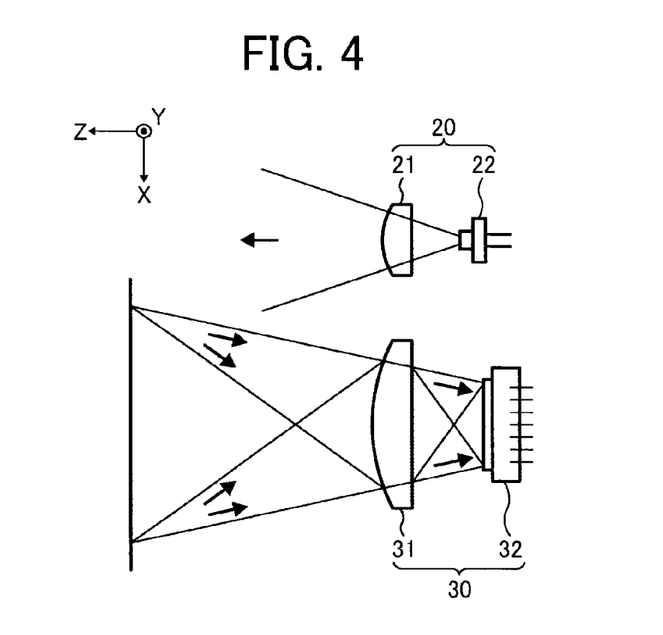
FIG. 4 is a schematic view of a configuration of the detection apparatus of FIG. 3.

FIG. 4 is a schematic view of a configuration of the detection apparatus 10. As shown in FIG. 4, the detection apparatus 10 includes, for example, a transmission unit 20 and a receiving unit 30.

In this description, a direction (i.e., horizontal direction) that the transmission unit 20 and the receiving unit 30 are arranged is referred to as X-axis direction, a detection direction of the detection apparatus 10 is referred to as Z-axis direction, and a direction perpendicular to both of the X-axis and Z-axis is referred to as Y-axis direction.

The transmission unit 20 includes, for example, the light projection lens 21 and a light source 22.

The laser light emitted from the light source 22 passes the light projection lens 21. The light projection lens 21 is used to control an emission direction and an emission angle of the laser light emitted from the light source 22 to parallel light including substantially parallel light. Therefore, the detection apparatus 10 can conduct distance measurement to a micro area of a detection target.

The light source 22 emits laser light to be irradiated to a detection target. The laser light emitted from the light source 22 is an example of transmission signal of an example embodiment of the present invention. The light source 22 is composed of, for example, a laser diode or a light emitting diode. The laser light emitted from the light source 22 is, for example, near infrared light having a wavelength range from 800 nm to 950 nm.

Further, the laser light emitted from the light source 22 is not limited to near infrared light, but can be far infrared light.

The receiving unit 30 includes, for example, the light receiving lens 31 and a light receiving element 32.

The laser light reflected at a detection target passes the light receiving lens 31. The light receiving lens 31 controls an incident direction and an incident angle of reflection light to the light receiving element 32. The reflection light incident to the light receiving lens 31 is an example of reflection signal of an example embodiment of the present invention.

The light receiving element 32 receives the reflection light that has passed the light receiving lens 31, and converts the reflection light to an electrical signal, and transmits the electrical signal to a control unit of a vehicle. The light receiving element 32 can use various photo diodes (i.e., photo electric converter) such as silicon PIN (P-Intrinsic-N) photo diode, and Avalanche Photo Diode (APD).

Further, the light receiving element 32 is divided into a plurality of light receiving parts in the X-axis direction, and each one of the light receiving parts receives the reflection light condensed by the light receiving lens 31 and converts the reflection light to an electrical signal. By dividing into a plurality of light receiving parts, the light receiving element 32 can recognize a size of detection target in the X-axis direction (i.e., horizontal direction).

In a configuration of FIG. 4, an axis of the laser light direction emitted from the transmission unit 20 and an axis of incident direction of reflection light received by the receiving unit 30 are shifted. Because a detection target and the detection apparatus 10 are distanced with enough distance, light emitted from the transmission unit 20 can irradiate a light receiving area of the receiving unit 30.

Further, in addition to dividing the light receiving element 32 into the above described one-dimensional direction (i.e., X-axis direction alone), the light receiving element 32 can be also divided into the Y-axis direction to detect reflection light two dimensionally. By using the light receiving element 32 divided two dimensionally, the light receiving element 32 can recognize a size of detection target in the Y-axis direction (i.e., vertical direction), with which the detection target can be detected more precisely.

Figure 5:
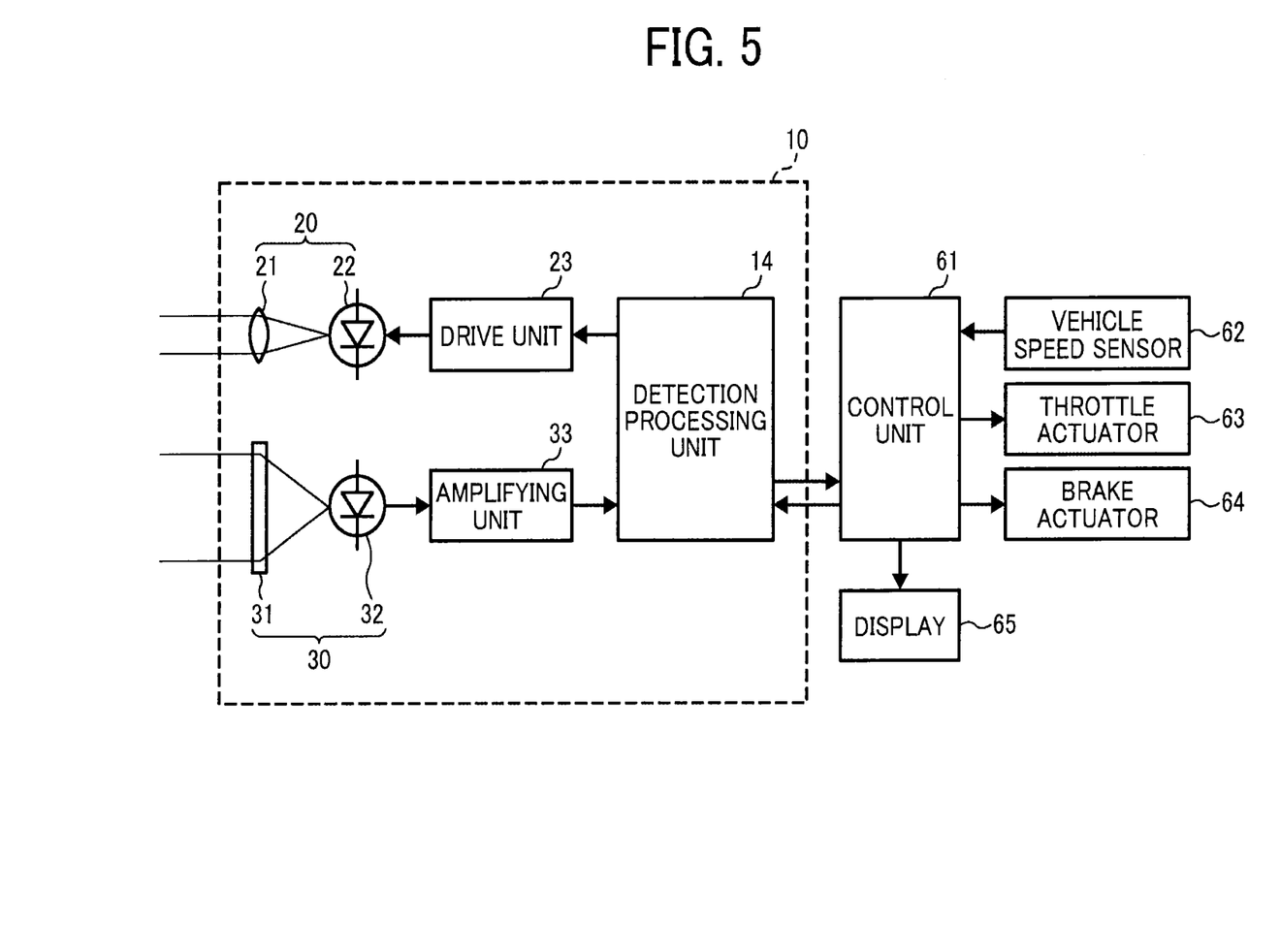
FIG. 5 is a functional block diagram of the detection apparatus.

FIG. 5 is a functional block diagram of the detection apparatus 10. As shown in FIG. 5, the detection apparatus 10 includes the transmission unit 20, the receiving unit 30, a drive unit 23, an amplifying unit 33, and a detection processing unit 14.

The drive unit 23 can increase voltage supplied from a vehicle to a given voltage, and generate an oscillation signal to drive the light source 22. Based on the generated oscillation signal, the light source 22 emits modulated light such as short pulse light having a pulse width of several nano seconds to several hundreds nano seconds periodically.

The amplifying unit 33 can amplify the electrical signal, corresponding to reflection light pulse output from the light receiving element 32, and transmits the amplified electrical signal to the detection processing unit 14.

Based on the electrical signal, the detection processing unit 14 detects a detection target. The detection processing unit 14 receives the electrical signal, corresponding to the reflection light pulse, from the amplifying unit 33, and computes distance to the detection target (referrer to vehicle-to-vehicle distance "d"), using the following formula (1) based on time Δt between emission and receiving of the laser light, and light speed C.

$$d = (C \times \Delta t)/2 \qquad (1)$$

Further, as shown in FIG. 5, a vehicle having the detection apparatus 10 includes, for example, a control unit 61, a vehicle speed sensor 62, a throttle actuator 63, and a brake actuator 64.

Based on the vehicle-to-vehicle distance "d" computed by the detection processing unit 14 and the vehicle speed signal obtained from the vehicle speed sensor 62, the control unit 61 controls the throttle actuator 63 and the brake actuator 64 to control the vehicle-to-vehicle distance "d."

Further, when the vehicle having the detection apparatus 10 becomes too close to a detection target, the control unit 61 transmits a display information to a display 65 such as a monitor to alert a driver.

Further, the control unit 61 controls activation and stop of the detection apparatus 10.

The vehicle speed sensor 62 obtains the vehicle speed signal based on rotation speed of wheel of the vehicle.

The throttle actuator 63 controls an engine output of the vehicle.

The brake actuator 64 controls a brake pressure of the vehicle.

Based on the display information received from the control unit 61, the display 65 displays messages such as a warning to a driver.

The above described detection apparatus 10 uses the light receiving element 32 having the light receiving member divided into a plurality of parts (i.e., non-scanning type), but the detection apparatus is not limited hereto. For example, light receiving member can be a scanning type that rotates a mirror.

Further, the electrical signal output from the light receiving element 32, corresponding to the received reflection light, can be output from the detection apparatus 10 as an analog signal or a digital signal.

(Configuration of Translucent Portion)

A description is given of a translucent portion for a transmission translucent portion and a receiving translucent portion of the detection apparatus 10.

Figure 6:
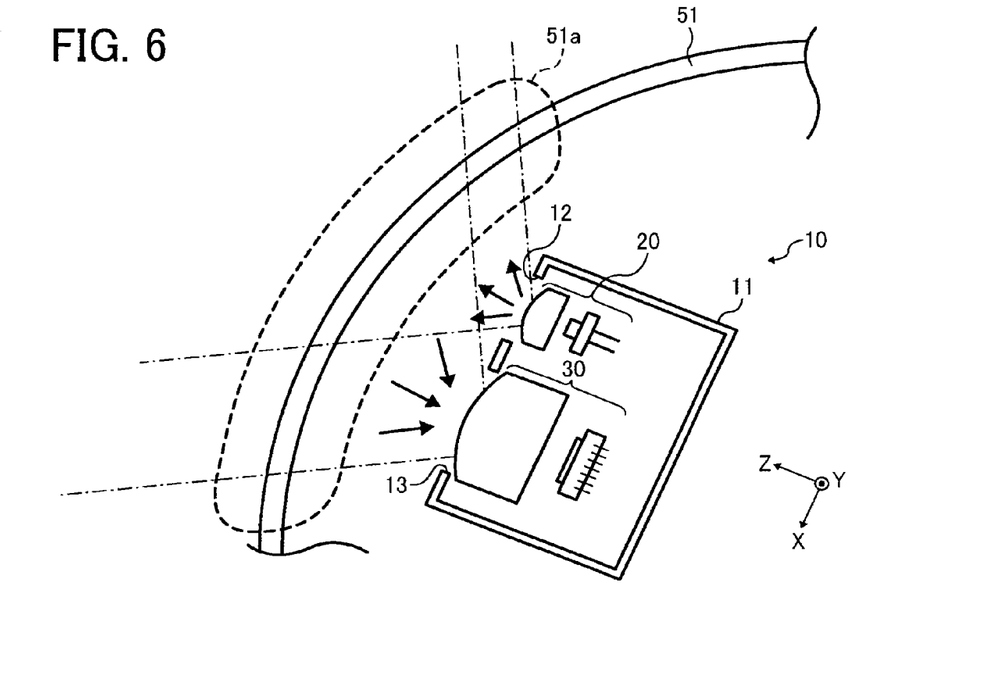
FIG. 6 is an expanded plan view of a vehicle at a front right side having the detection apparatus.

FIG. 6 is an expanded plan view of the vehicle 50 at a front right side having the detection apparatus 10. As shown in FIG. 6, the detection apparatus 10 is disposed inside the bumper 51, which is a component of the vehicle 50 and an example of the structure. The detection apparatus 10 is disposed by setting a detection direction to a vehicle forward direction such as Z-axis direction.

The bumper 51 includes a translucent portion 51a. The translucent portion 51a can be used as a transmission translucent portion and a receiving translucent portion. The laser light emitted from the transmission unit 20 and passing the transmission translucent window 12 can pass through the transmission translucent portion. Further, the reflection light reflected from a detection target can pass through the receiving translucent portion before the reflection light passes the receiving translucent window 13.

In a configuration of FIG. 6, the laser light and the reflection light can pass through the translucent portion 51a. Therefore, the translucent portion 51a can be used as the transmission translucent portion and the receiving translucent portion.

Figure 7:
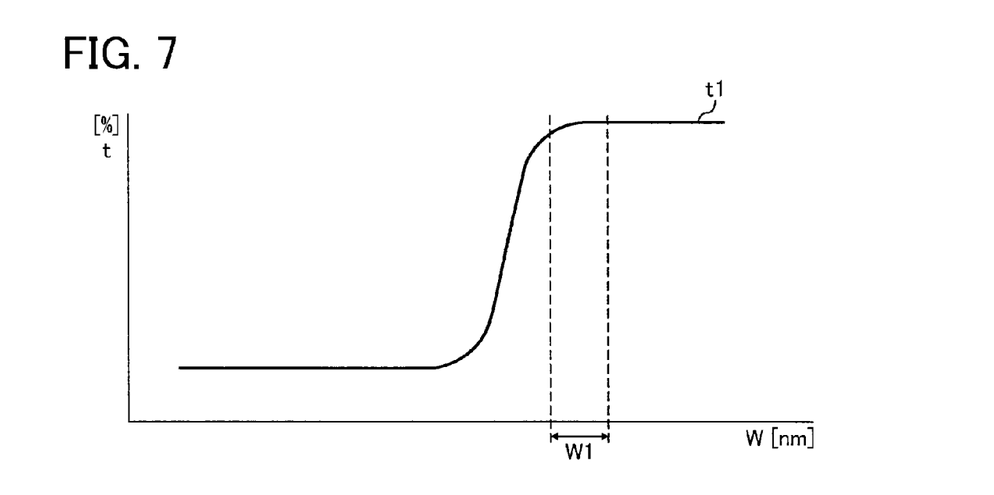
FIG. 7 is a graph of light transmittance ratio of the detection apparatus.

FIG. 7 is a graph of light transmittance ratio of the detection apparatus 10 according to an example embodiment. A shown in FIG. 7, material of the bumper 51 having the translucent portion 51a has a desired transmittance ratio for a wavelength range of the laser light used as the transmission signal. Further, the material of the bumper 51 having the translucent portion 51a has a desired transmittance ratio for a wavelength range of the reflection light reflected from a detection target when the laser light is irradiated to the detection target.

Light transmittance ratio t1 of the translucent portion 51a for a wavelength range w1 of the laser light and the corresponding reflection light is set to a given value, which is enough greater than light transmittance ratio of other wavelength range. The light transmittance ratio t1 is a transmittance ratio that can pass the reflection light with enough intensity so that the light receiving element 32 can detect a detection target when the laser light is irradiated to the detection target, existing at a given distance position, and then laser light is returned as the reflection light from the detection target.

Further, the material of the translucent portion 51a is material that can pass near infrared light when the transmission signal is near infrared light having a wavelength range of 800 nm to 950 nm.

The material of the translucent portion 51a of the bumper 51 having is, for example, ACRYFILTER IR™ of Mitsubishi Rayon Co., Ltd.

Further, the surface of material of the bumper 51 including the translucent portion 51a can be disposed with a reflection film such as a dielectric multilayer that can reflect visible light range so that the color of reflection light (visible light range) can be controlled to similar or same as the appearance color of the bumper 51.

With this configuration, the translucent portion 51a can pass the laser light and the corresponding reflection light having a given wavelength range such as near infrared light while color of reflection light (visible light) from the translucent portion 51a can be set to a given color similar or same as the appearance color of the bumper 51

The color setting of the reflection light reflected from the translucent portion 51a can be conducted using known technologies.

In the above described configuration, the bumper 51 and the translucent portion 51a are formed as one part but not limited hereto. For example, the bumper 51 and the translucent portion 51a can be formed as different parts, and then integrated as one part. As above described, by depositing a dielectric multilayer on the surface of the translucent portion 51a, color of reflection light reflected from the translucent portion 51a can be similar or same color of appearance of the bumper 51.

Further, anti-contamination processing can be conducted on the surface of the translucent portion 51a, which corresponds to at least one of the transmission translucent portion and the receiving translucent portion. By conducting the anti-contamination processing, contamination may not occur on the surface of the translucent portion 51a easily, with which light can pass with stabilized condition, and detection performance of a detection target can be stabilized.

The anti-contamination processing can use water-repellent effect or hydrophilic effect. The surface of the translucent portion 51a can use any of water-repellent effect and hydrophilic effect.

Further, the anti-contamination processing can be conducted by coating material that controls a contact angle of liquid on the surface of the translucent portion 51a. Further, the anti-contamination processing can be a micro structure formed on the surface of the translucent portion 51a to control a contact angle of liquid on the surface of the translucent portion 51a.

Further, the anti-contamination processing can be fluorine film formed on the surface of the translucent portion 51a to prevent adhesion of dust, and titanium oxide film formed on the surface of the translucent portion 51a as photo catalyst having cleaning effect.

As to the above described detection apparatus 10, the laser light and the reflection light having the wavelength range used for detecting a detection target can pass through the translucent portion 51a, but other light having other wavelength range is hard to pass through. Therefore, as to the detection apparatus 10, because noise light is difficult to receive by the light receiving element 32, the detection apparatus 10 can detect a detection target and measure distance to the detection target with stable manner.

Further, as to the detection apparatus 10, the translucent portion 51a can pass the laser light and the corresponding reflection light while the translucent portion 51a can be seen similar or same color of the bumper 51 by human eyes. Therefore, the detection apparatus 10 can be disposed without causing appearance difference for the bumper 51, wherein the appearance difference may generate a feeling of strangeness.

(Vehicle (1))

A description is given of a vehicle according to an example embodiment of the present invention, in which the detection apparatus according to an example embodiment can be attached to a component of the vehicle.

Figure 8:
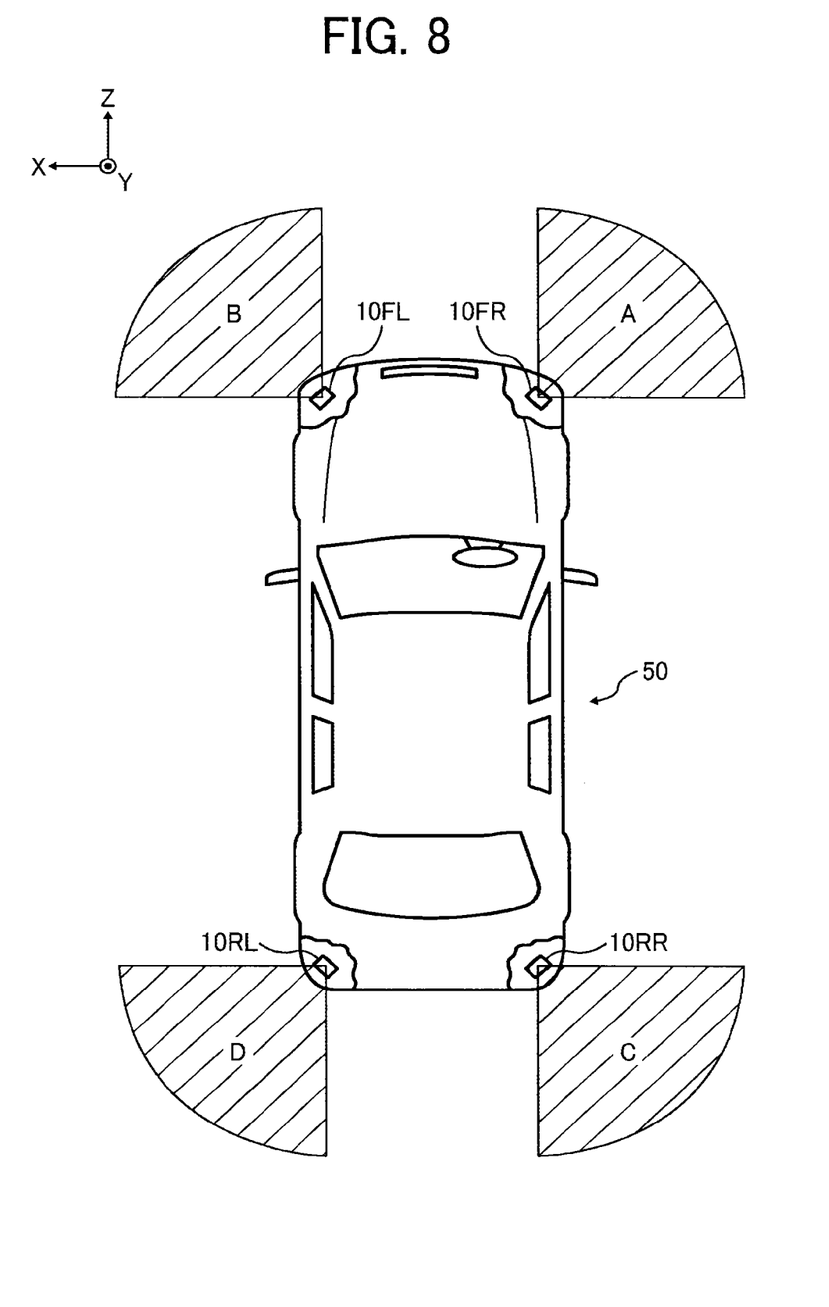
FIG. 8 is a plan view of a vehicle according to an example embodiment.

FIG. 8 is a plan view of a vehicle 50 according to an example embodiment. As shown in FIG. 8, the detection apparatus 10 can be attached at each of right-side ends and left-side ends of the vehicle 50. Specifically, the vehicle 50 is attached with, for example, four detection apparatuses 10, in which a detection apparatus 10FR is attached at a front-right end, a detection apparatus 10FL is attached at a front-left end, a detection apparatus 10RR is attached at a rear-right end, and a detection apparatus 10RL is attached at a rear-left end of the vehicle 50.

In the following perspective views of the vehicle 50, an attachment position of the detection apparatus 10 in the vehicle 50 is described with partially see-through views because, in usually used conditions, the detection apparatus 10 cannot be seen from the outside of the vehicle 50.

Further, FIG. 8 shows a detection area A of the detection apparatus 10FR, a detection area B of the detection apparatus 10FL, a detection area C of the detection apparatus 10RR, and a detection area D of the detection area 10RL. As shown in FIG. 8, the detection areas A, B, C, and D are respectively set for the detection apparatus 10FR, 10FL, 10RR, and 10RL.

In a configuration of FIG. 8, the detection areas A, B, C, and D of the detection apparatus 10FR, 10FL, 10RR, and 10RL are set without overlapping the detection areas with each other. In another configuration, each of the detection areas can be overlapped with each other so that entire surrounding of the vehicle can be detected, in which a non-detectable area around the vehicle 50 can be substantially eliminated.

Further, the number of the detection apparatuses 10 attached to the vehicle 50 is not limited four as shown in FIG. 8, but five or more of the detection apparatuses 10 can be attached.

Further, the attachment position of the detection apparatus 10 attached to the vehicle 5 is not limited to the attachment positions shown in FIG. 8. For example, the detection apparatus 10 can be attached at a front head of the vehicle, or a center of side of the vehicle.

As above described, the attachment numbers and attachment positions of the detection apparatus 10 can be adjusted in view of an entire detection area around the vehicle 50 so that the entire area around the vehicle 50 can be covered as a detection area.

Figure 9:
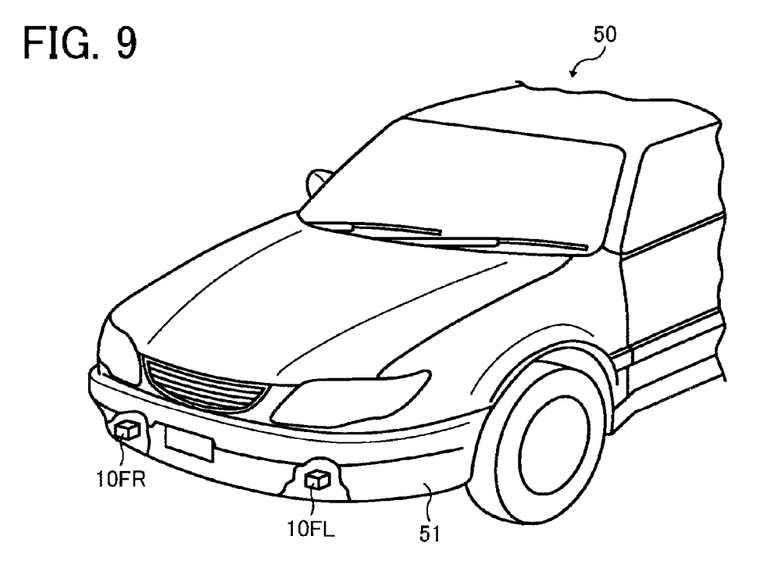
FIG. 9 is a perspective view of the vehicle of FIG. 8.

FIG. 9 is a perspective view of the vehicle 50. As shown in FIG. 9, the detection apparatus 10 can be attached inside the bumper 51, which is an example of a structure of the vehicle 50, in which the detection apparatus 10FR is attached at a front right of a forward direction of the vehicle 50, and the detection apparatus 10FL is attached at a front left of the forward direction of the vehicle 50.

The bumper 51 is disposed with the translucent portion 51a shown in FIG. 6. The translucent portion 51a can be used as the transmission translucent portion, wherein the laser light emitted from the transmission unit 20 and passing the transmission translucent window 12 can pass through the transmission translucent portion. Further, the translucent portion 51a can be used as the receiving translucent portion, wherein the reflection light reflected from a detection target can pass through the receiving translucent portion before passing the receiving translucent window 13.

As above described, the light transmittance ratio t1 of the translucent portion 51a for a wavelength range w1 of the laser light and the corresponding reflection light is set to a given value enough greater than light transmittance ratio of other wavelength range. The light transmittance ratio t1 is a transmittance ratio that can pass through the reflection light with enough intensity so that the light receiving element 32 can detect a detection target when the laser light is irradiated to the detection target, existing at a given distance position, and then the laser light is returned as the reflection light from the detection target.

Further, the surface of material of the bumper 51 including the translucent portion 51a can be disposed with a reflection film such as a dielectric multilayer that can reflect visible light range so that the color of reflection light (visible light range) can be controlled to similar or same as the appearance color of the bumper 51.

With this configuration, the translucent portion 51*a* can pass the laser light and the corresponding reflection light having a given wavelength range such as near infrared light while color of reflection light (visible light) from the translucent portion 51*a* can be set to a given color similar or same as the appearance color of the bumper 51.

As to the above described the vehicle 50, the laser light and the reflection light having the wavelength range used for detecting a detection target can pass through the translucent portion 51*a*, but other light having other wavelength range is hard to pass through. Therefore, as to the vehicle 50, because noise light is difficult to receive by the light receiving element 32, the detection apparatus 10 can detect a detection target and measure distance to the detection target with stable manner.

Further, as to the vehicle 50, the translucent portion 51*a* can pass the laser light and the corresponding reflection light while the translucent portion 51*a* can be seen similar or same color of the bumper 51 by human eyes. Therefore, the detection apparatus 10 can be disposed without causing appearance difference for the bumper 51, wherein the appearance difference may generate a feeling of strangeness.

(Detection Apparatus (2))

A description is given of a detection apparatus 110 according to another example embodiment. In this description, difference of the detection apparatus 110 and the above described detection apparatus 10 is described.

Figure 10:
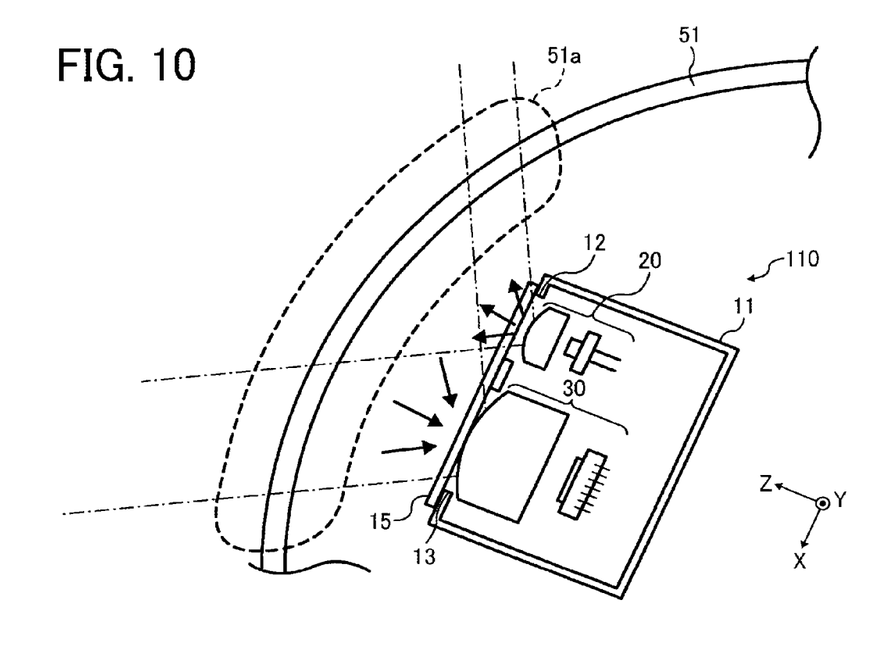
FIG. 10 is an expanded plan view of a vehicle at a front right side having a detection apparatus of another example embodiment.

FIG. 10 is an expanded plan view of a front right portion of the vehicle 50 having the detection apparatus 110. As shown in FIG. 10, the detection apparatus 110 includes a wavelength limiting member 15 that covers the transmission translucent window 12 and the receiving translucent window 13 from a detection direction, which is a different configuration compared to the detection apparatus 10.

Figure 11:
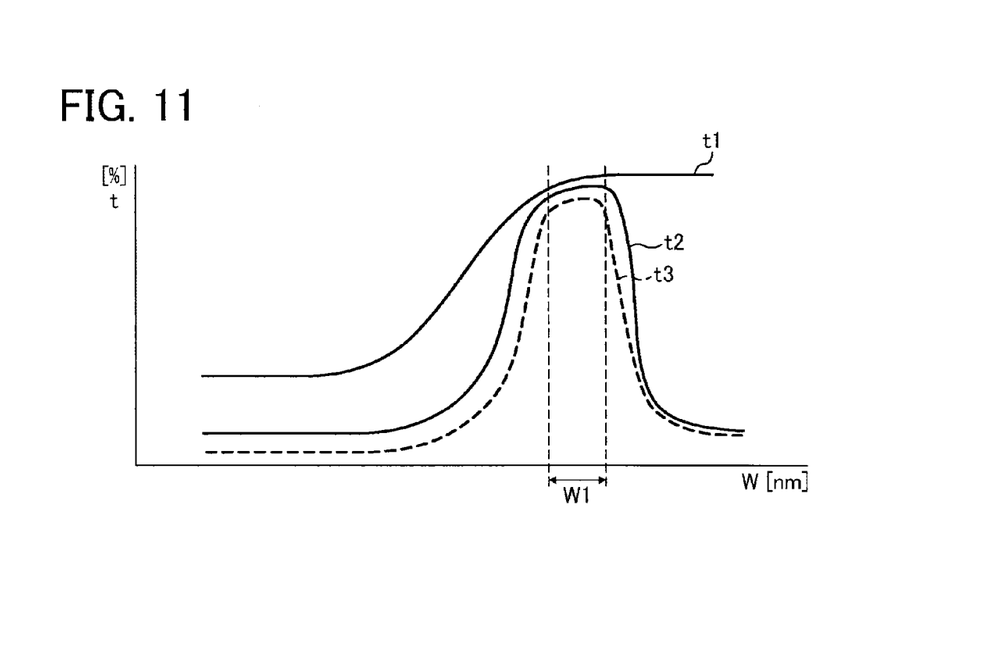
FIG. 11 is a graph of light transmittance ratio of the detection apparatus of FIG. 10.

FIG. 11 is a graph of light transmittance ratio of the detection apparatus 110. A shown in FIG. 11, light transmittance ratio t3 of the detection apparatus 110 can be obtained by synthesizing light transmittance ratio t1 of the translucent portion 51*a* and light transmittance ratio t2 of the wavelength limiting member 15. The light transmittance ratio t3 of the detection apparatus 110 is set so that only the light transmittance ratio of the wavelength range w1 used for the transmission signal and the receiving signal can be high enough by disposing the wavelength limiting member 15.

As to the detection apparatus 110, the laser light and the reflection light having the wavelength range used for detecting a detection target can pass through the translucent portion 51*a* and the wavelength limiting member 15, but other light having the other wavelength range is hard to pass through. Therefore, as to the detection apparatus 110 having the translucent portion 51*a* and the wavelength limiting member 15, because noise light is difficult to receive by the light receiving element 32, the detection apparatus 110 can detect a detection target and measure distance to the detection target with stable manner.

(Vehicle (2))

A description is given of a vehicle 50A according to another example embodiment of the present invention. In this description, difference of the vehicle 50A and the above described vehicle 50 is described.

Figure 12:
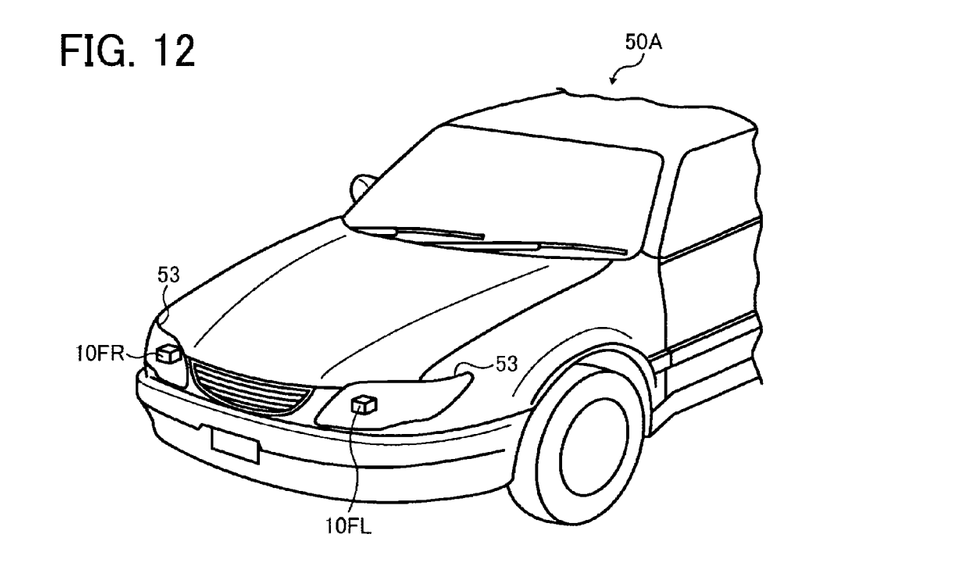
FIG. 12 is a perspective view of a vehicle of another example embodiment.

FIG. 12 is a perspective view of the vehicle 50A. As shown in FIG. 12, the detection apparatuses 10FR and 10FL are disposed inside a head lamp 53 of the vehicle 50 A, which is different from the vehicle 50.

The head lamp 53 has a translucent cover made of resin material and having translucency.

Similar to the translucent portion 51*a* of the bumper 51 shown in FIG. 6, the cover of the head lamp 53 includes a transmission translucent portion, wherein the laser light passing the transmission translucent window 12 can pass through the transmission translucent portion. Further, the cover of the head lamp 53 includes the receiving translucent portion, wherein the reflection light reflected from a detection target can pass through the receiving translucent portion before passing the receiving translucent window 13.

Similar to the above translucent portion 51*a* shown in FIG. 6, the laser light and the reflection light having the wavelength range used for detecting a detection target can pass through the cover of the head lamp 53, but other light having other wavelength range is hard to pass through. Therefore, as to the vehicle 50A having the cover of the head lamp 53, because noise light is difficult to receive by the light receiving element 32, the detection apparatus can detect a detection target and measure distance to the detection target with stable manner.

Further, as to the vehicle 50A, the transmission translucent portion and the receiving translucent portion of the cover of the head lamp 53 can pass the laser light and the corresponding reflection light while the transmission translucent portion and the receiving translucent portion can be seen similar or same color of the cover of the head lamp 53 by human eyes (e.g., transparent when the cover is transparent). Therefore, as to the vehicle 50A, the detection apparatuses 10FR and 10FL can be disposed without causing appearance difference for the cover of the head lamp 53, wherein the appearance difference may generate a feeling of strangeness.

(Vehicle (3))

A description is given of a vehicle 50B according to another example embodiment of the present invention. In this description, difference of the vehicle 50B and the above described vehicles 50 and 50A is described.

Figure 13:
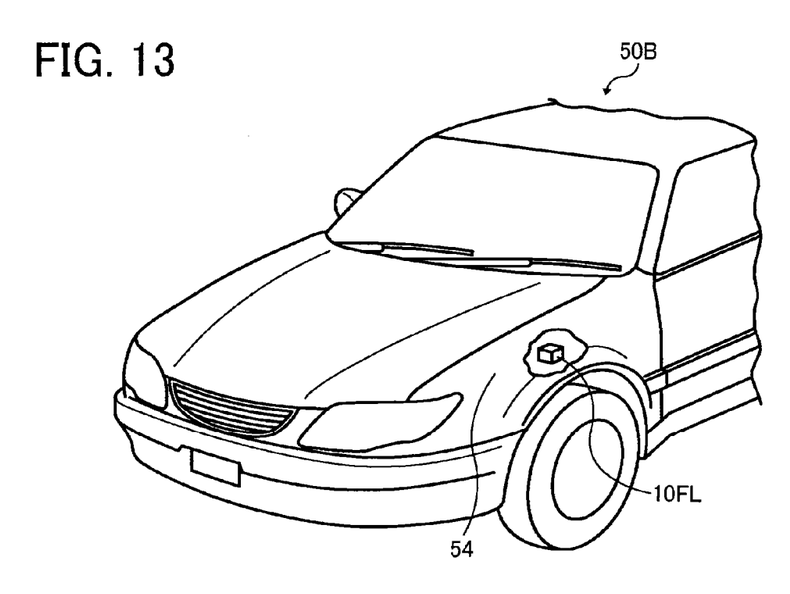
FIG. 13 is a perspective view of a vehicle of another example embodiment.

FIG. 13 is a perspective view of the vehicle 50B. As shown in FIG. 13, the detection apparatus 10FL is disposed inside a side turn lamp (or winker) disposed in a front fender 54 of the vehicle 50B, which is different from the above described vehicles 50 and 50A.

The side turn lamp has a translucent cover made of resin material and having translucency.

Similar to the translucent portion 51*a* of the bumper 51 shown in FIG. 6, the cover of the side turn lamp includes the transmission translucent portion, wherein the laser light passing the transmission translucent window 12 can pass through the transmission translucent portion. Further, the cover of the side turn lamp includes the receiving translucent portion, wherein the reflection light reflected from a detection target can pass through the receiving translucent portion before passing the receiving translucent window 13.

Similar to the translucent portion 51*a* shown in FIG. 6, the laser light and the reflection light having the wavelength range used for detecting a detection target can pass through the cover of the side turn lamp, but other light having other wavelength range is hard to pass through. Therefore, as to the vehicle 50B having the cover of the side turn lamp, because noise light is difficult to receive by the light receiving element 32, the detection apparatus can detect a detection target and measure distance to the detection target with stable manner.

Further, as to the vehicle 50B, the transmission translucent portion and the receiving translucent portion of the cover of the side turn lamp can pass the laser light and the corresponding reflection light while the transmission translucent portion and the receiving translucent portion can be seen similar or same color of the cover of the side turn lamp by human eyes (e.g., transparent when the cover is transparent). Therefore, as to the vehicle 50B, the detection apparatuses 10FR and 10FL can be disposed without causing appearance difference for the cover of the side turn lamp, wherein the appearance difference may generate a feeling of strangeness.

(Vehicle (4))

A description is given of a vehicle 50C according to another example embodiment of the present invention. In this description, difference of the vehicle 50C and the above described vehicles 50, 50A and 50B is described.

Figure 14:
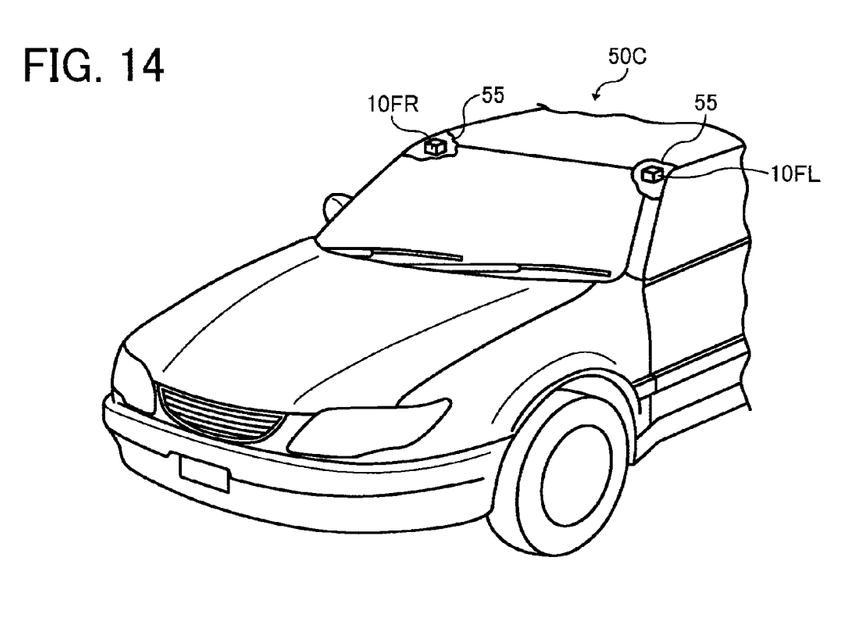
FIG. 14 is a perspective view of a vehicle of another example embodiment.

FIG. 14 is a perspective view of the vehicle 50C. As shown in FIG. 14, the detection apparatuses 10FR and 10FL are disposed inside a pillar 55 of the vehicle 50C, which is different from the above described vehicles 50, 50A and 50B.

Similar to the translucent portion 51a of the bumper 51 shown in FIG. 6, the pillar 55 includes a translucent portion which can be used as the transmission translucent portion and the receiving translucent portion. The laser light passing through the transmission translucent window 12 can pass through the transmission translucent portion. Further, the reflection light reflected from a detection target can pass through the receiving translucent portion before passing the receiving translucent window 13.

Similar to the translucent portion 51a shown in FIG. 6, the laser light and the reflection light having the wavelength range used for detecting a detection target can pass through the translucent portion of the pillar 55, but other light having other wavelength range is hard to pass through. Therefore, as to the vehicle 50C having the translucent portion of the pillar 55, because noise light is difficult to receive by the light receiving element 32, the detection apparatus can detect a detection target and measure distance to the detection target with stable manner.

Further, as to the vehicle 50C, the transmission translucent portion and the receiving translucent portion of the translucent portion of the pillar 55 can pass the laser light and the corresponding reflection light while the transmission translucent portion and the receiving translucent portion can be seen similar or same color of the cover of the pillar 55 by human eyes. Therefore, as to the vehicle 50C, the detection apparatuses 10FR and 10FL can be disposed without causing appearance difference for the pillar 55, wherein the appearance difference may generate a feeling of strangeness.

(Vehicle (5))

A description is given of a vehicle 50D according to another example embodiment of the present invention. In this description, difference of the vehicle 50D and the above described vehicles 50, 50A 50B and 50C is described.

Figure 15:
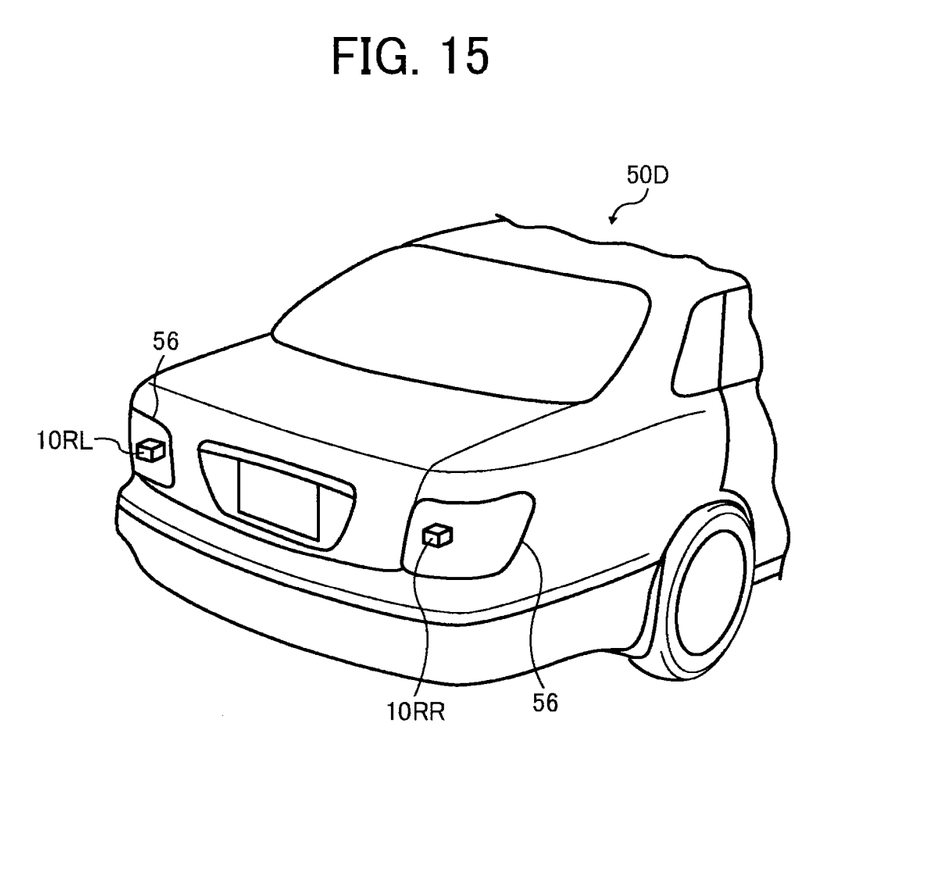
FIG. 15 s a perspective view of a vehicle of another example embodiment.

FIG. 15 is a perspective view of the vehicle 50D. As shown in FIG. 15, the detection apparatuses 10RR and 10RL are disposed inside a rear combination lamp 56 (or stop lamp 56) of the vehicle 50D, which is different from the above described vehicles 50, 50A 50B and 50C.

The rear combination lamp 56 has a translucent cover made of resin material and having transparency.

Similar to the translucent portion 51a of the bumper 51 shown in FIG. 6, the cover of the rear combination lamp 56 includes the transmission translucent portion and the receiving translucent portion. The laser light passing the transmission translucent window 12 can pass through the transmission translucent portion. Further, the reflection light reflected from a detection target can pass through the receiving translucent portion before passing the receiving translucent window 13.

Similar to the translucent portion 51a shown in FIG. 6, the laser light and the reflection light having the wavelength range used for detecting a detection target can pass through the cover of the rear combination lamp 56, but other light having other wavelength range is hard to pass through. Therefore, as to the vehicle 50D having the cover of the rear combination lamp 56, because noise light is difficult to receive by the light receiving element 32, the detection apparatus can detect a detection target and measure distance to the detection target with stable manner.

Further, as to the vehicle 50D, the transmission translucent portion and the receiving translucent portion of the cover of the rear combination lamp 56 can pass the laser light and the corresponding reflection light while the transmission translucent portion and the receiving translucent portion can be seen similar or same color of the cover of the rear combination lamp 56 by human eyes (e.g., transparent when the cover is transparent). Therefore, as to the vehicle 50D, the detection apparatuses 10RR and 110RL can be disposed without causing appearance difference for the cover of the rear combination lamp 56, wherein the appearance difference may generate a feeling of strangeness.

The above described detection apparatus according to one or more of example embodiments can provide desired detection performance.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A detection apparatus for use with a vehicle, comprising:
    a structure including a bumper or a lamp and including a transmission translucent portion and a receiving translucent portion; and
    a detection device, the detection device comprising:
        a transmitter to transmit a transmission signal having a wavelength range corresponding to non-visible light that passes through the transmission translucent portion of the structure;
        a receiver to receive a reflection signal of the transmission signal reflected from a detection target, the reflection signal having a wavelength range corresponding to non-visible light that passes through the receiving translucent portion of the structure; and
        a processor to detect the detection target based on the reflection signal,
    wherein a surface of the transmission translucent portion and a surface of the receiving translucent portion of the structure are disposed with a reflection film that can reflect visible light,
    wherein the transmission translucent portion and the receiving translucent portion of the structure both have a same appearance color as an appearance color of the bumper or the lamp, and wherein the detection device is disposed between a portion of a main body of the vehicle and an outer portion of the bumper or the lamp behind a location of the transmission translucent portion and the receiving translucent portion of the structure.

2. The detection apparatus of claim 1, wherein the transmission translucent portion passes the transmission signal having the wavelength range corresponding to non-visible light.

3. The detection apparatus of claim 1, wherein the receiving translucent portion passes the reflection signal having the wavelength range corresponding to non-visible light.

4. The detection apparatus of claim 1, wherein at least one of a surface of the transmission translucent portion and a surface of the receiving translucent portion is processed with anti-contamination.

5. The detection apparatus of claim 1, wherein the transmitter emits laser light as the transmission signal.

6. The detection apparatus of claim 1, wherein the bumper or the lamp comprises a bumper.

7. A vehicle comprising:
the detection apparatus of claim 1 to detect a detection target outside the vehicle.

8. The detection apparatus of claim 1, further comprising:
a wavelength limiting member that covers the transmission translucent portion and the receiving translucent portion.

9. The detection apparatus of claim 1, wherein the bumper or the lamp comprises a lamp.

10. The detection apparatus of claim 9, wherein the structure is a head lamp.

11. The detection apparatus of claim 9, wherein the structure is a lamp including a function to indicate a turn.

12. The detection apparatus of claim 11, wherein the structure is a side turn lamp.

13. The detection apparatus of claim 1, wherein:
the transmission translucent portion and the receiving translucent portion are a same translucent portion.

* * * * *